United States Patent
Lee et al.

(10) Patent No.: US 12,049,535 B2
(45) Date of Patent: Jul. 30, 2024

(54) POLYOL COMPOSITION COMPRISING ANHYDROSUGAR ALCOHOLS AND ANHYDROSUGAR ALCOHOL POLYMER

(71) Applicant: SAMYANG CORPORATION, Seoul (KR)

(72) Inventors: Jae Hoon Lee, Daejeon (KR); Hoon Ryu, Daejeon (KR); Gwang Seok Song, Jeonju-si (KR); Jae Guk Noh, Daejeon (KR); Seung Hyun Yoo, Daejeon (KR); Jun Seop Im, Hwaseong-si (KR); Won Hyun Jeon, Seoul (KR)

(73) Assignee: SAMYANG CORPORATION, Seoul (KR)

( * ) Notice: Subject to any disclaimer, the term of this patent is extended or adjusted under 35 U.S.C. 154(b) by 450 days.

(21) Appl. No.: 17/616,465

(22) PCT Filed: Jun. 3, 2020

(86) PCT No.: PCT/KR2020/007190
§ 371 (c)(1),
(2) Date: Dec. 3, 2021

(87) PCT Pub. No.: WO2020/246789
PCT Pub. Date: Dec. 10, 2020

(65) Prior Publication Data
US 2022/0177636 A1 Jun. 9, 2022

(30) Foreign Application Priority Data
Jun. 4, 2019 (KR) .................. 10-2019-0065785

(51) Int. Cl.
*C08G 18/32* (2006.01)
*C08G 18/10* (2006.01)
*C09J 175/04* (2006.01)

(52) U.S. Cl.
CPC ......... *C08G 18/3218* (2013.01); *C08G 18/10* (2013.01); *C08G 18/32* (2013.01); *C09J 175/04* (2013.01)

(58) Field of Classification Search
CPC .... C08G 18/3218; C08G 18/10; C08G 18/32; C09J 175/04
See application file for complete search history.

(56) References Cited

U.S. PATENT DOCUMENTS

| 2013/0109804 A1* | 5/2013 | Kusaka .............. C08G 64/1608 |
| | | 528/370 |
| 2017/0145442 A1 | 5/2017 | Wyart et al. |
| 2021/0147609 A1* | 5/2021 | Song ..................... C08G 18/10 |

FOREIGN PATENT DOCUMENTS

| JP | 2002-80602 A | 3/2002 |
| JP | 2003-160727 A | 6/2003 |
| JP | 2008-115325 A | 5/2008 |
| KR | 10-1079518 B1 | 11/2011 |
| KR | 10-2012-0066904 A | 6/2012 |
| KR | 10-2014-0048436 A | 4/2014 |
| KR | 10-2014-0105185 A | 9/2014 |
| KR | 10-2017-0015290 A | 2/2017 |
| WO | WO 2012/081785 A1 | 6/2012 |

OTHER PUBLICATIONS

International Search Report for PCT/KR2020/007190 mailed on Sep. 9, 2020.

* cited by examiner

*Primary Examiner* — Michael L Leonard
(74) *Attorney, Agent, or Firm* — Birch, Stewart, Kolasch & Birch, LLP

(57) ABSTRACT

The present invention relates to a polyol composition comprising anhydrosugar alcohols and an anhydrosugar alcohol polymer and, more specifically, to a polyol composition comprising a monoanhydrosugar alcohol, a dianhydrosugar alcohol, and a polymer of a monoanhydrosugar alcohol and/or a dianhydrosugar alcohol, the polyol composition being usable in various fields since the physical property conditions of the composition, such as number average molecular weight (Mn), polydispersity index (PDI) and hydroxyl value, satisfy specific levels, and, particularly, being capable of remarkably improving the physical properties of a polyurethane, such as tensile strength and elongation, when used as a polyurethane chain extender.

12 Claims, No Drawings

POLYOL COMPOSITION COMPRISING ANHYDROSUGAR ALCOHOLS AND ANHYDROSUGAR ALCOHOL POLYMER

TECHNICAL FIELD

The present invention relates to a polyol composition comprising anhydrosugar alcohol and polymer of anhydrosugar alcohol, and more specifically, a polyol composition which comprises monoanhydrosugar alcohol, dianhydrosugar alcohol, and polymer of one or more of monoanhydrosugar alcohol and dianhydrosugar alcohol, and has properties such as number average molecular weight (Mn), poly dispersity index (PDI) and hydroxyl value of composition satisfying specific levels, and thus can be used in various fields, and particularly when used as a chain extender for polyurethane, can remarkably improve the physical properties such as tensile strength, elongation ratio, etc. of the polyurethane.

BACKGROUND ART

Hydrogenated sugar (also referred to as "sugar alcohol") means a compound obtained by adding hydrogen to the reductive end group in sugar, and generally has a chemical formula of $HOCH_2(CHOH)_nCH_2OH$ wherein n is an integer of 2 to 5. According to the number of carbon atoms, hydrogenated sugar is classified into tetritol, pentitol, hexitol and heptitol (4, 5, 6 and 7 carbon atoms, respectively). Among them, hexitol having 6 carbon atoms includes sorbitol, mannitol, iditol, galactitol, etc. and in particular, sorbitol and mannitol are very useful materials.

Anhydrosugar alcohol has a diol form with two hydroxyl groups in the molecule, and can be produced by using hexitol derived from starch (for example, Korean Patent No. 10-1079518 and Korean Laid-open Patent Publication No. 10-2012-0066904). Because anhydrosugar alcohol is an environmentally friendly material derived from recyclable natural resources, it has received much interest for a long time and researches on its production continue to proceed. Among such anhydrosugar alcohols, isosorbide produced from sorbitol has the widest industrial applicability at present.

Anhydrosugar alcohol can be used in various fields including treatment of heart and blood vessel diseases, patch adhesive, medicaments such as mouthwash, etc., solvents for compositions in the cosmetics industry, emulsifiers in the food industry, etc. In addition, it can increase the glass transition temperature of polymer materials like polyester, PET, polycarbonate, polyurethane, epoxy resin, etc., and improve the strength of such materials. Furthermore, because anhydrosugar alcohol is an environmentally friendly material derived from natural resources, it is very useful in the plastics industry such as bioplastics and the like. It is also known that anhydrosugar alcohol can be used as an adhesive, environmentally friendly plasticizer, biodegradable polymer, and environmentally friendly solvent for water-soluble lacquer.

As such, anhydrosugar alcohol is receiving much interest because of its wide applicability, and the level of practical industrial application thereof is increasing.

Conventionally, the byproduct obtained in a procedure for preparing anhydrosugar alcohol by dehydration reaction of hydrogenated sugar has been used simply as a binder, and a special use thereof has not been considered.

Korean Laid-open Patent Publication No. 10-2017-0015290 discloses a polyol composition comprising anhydrosugar alcohol and polymer of anhydrosugar alcohol prepared by dehydration reaction of hydrogenated sugar and simple distillation of the reaction product under reduced pressure. However, if the disclosed polyol composition is used as a chain extender for polyurethane, there is a problem that physical properties such as tensile strength, elongation ratio, etc. of the prepared polyurethane become poor.

CONTENTS OF THE INVENTION

Problems to be Solved

The purpose of the present invention is to provide a polyol composition comprising monoanhydrosugar alcohol, dianhydrosugar alcohol, and polymer of one or more of monoanhydrosugar alcohol and dianhydrosugar alcohol, which can be used in various fields, and particularly when used as a chain extender for polyurethane, can remarkably improve the physical properties such as tensile strength, elongation ratio, etc. of the polyurethane.

Technical Means

In order to achieve the above-stated purpose, the present invention provides a polyol composition comprising monoanhydrosugar alcohol; dianhydrosugar alcohol; and polymer of one or more of monoanhydrosugar alcohol and dianhydrosugar alcohol, wherein: (i) the number average molecular weight (Mn) of the composition is 160 to 445 g/mol: (ii) the poly dispersity index (PDI) of the composition is 1.25 to 3.15; and (iii) the hydroxyl value of the composition is 645 to 900 mgKOH/g.

According to another aspect, the present invention provides a chain extender comprising the polyol composition of the present invention.

According to another aspect, the present invention provides a chain-extended polyurethane, comprising: polyurethane prepolymer; and chain-extended part by the chain extender of the present invention.

According to another aspect, the present invention provides a polyurethane adhesive comprising the chain-extended polyurethane of the present invention.

Effect of the Invention

The polyol composition according to the present invention is an anhydrosugar alcohol-based polyol composition having polyol functional groups which can be obtained by utilizing byproduct generated in a procedure for preparing intramolecular dehydration product of hydrogenated sugar, and thus it can improve economy and environmental friendliness, and can be used in various fields, and particularly when it is used as a chain extender for polyurethane, it can remarkably improve the physical properties such as tensile strength, elongation ratio, etc. of the polyurethane.

Concrete Mode for Carrying Out the Invention

The present invention will be explained in detail below.

The polyol composition of present invention comprises monoanhydrosugar alcohol; dianhydrosugar alcohol: and polymer of one or more of monoanhydrosugar alcohol and dianhydrosugar alcohol.

Anhydrosugar alcohol can be prepared by dehydration reaction of hydrogenated sugar derived from natural product. Hydrogenated sugar (also referred to as "sugar alcohol") means a compound obtained by adding hydrogen to the reductive end group in sugar, and generally has a chemical formula of $HOCH_2(CHOH)_nCH_2OH$ wherein n is an integer of 2 to 5. According to the number of carbon atoms, hydrogenated sugar is classified into tetritol, pentitol, hexitol and heptitol (4, 5, 6 and 7 carbon atoms, respectively). Among them, hexitol having 6 carbon atoms includes sorbitol, mannitol, iditol, galactitol, etc. and in particular, sorbitol and mannitol are very useful materials.

Among the monoanhydrosugar alcohol: dianhydrosugar alcohol: and polymer of one or more of monoanhydrosugar alcohol and dianhydrosugar alcohol (that is, polymer of monoanhydrosugar alcohol and/or dianhydrosugar alcohol) contained in the polyol composition of present invention, one or more, preferably two or more, and more preferably all of them can be obtained in a procedure for preparing anhydrosugar alcohol by dehydration reaction of hydrogenated sugar (for example, hexitol such as sorbitol, mannitol, iditol, etc.).

Monoanhydrosugar alcohol is an anhydrosugar alcohol formed by removing one molecule of water from inside of the hydrogenated sugar, and it has a tetraol form with four hydroxyl groups in the molecule.

In the present invention, the kind of the monoanhydrosugar alcohol is not especially limited, and it may be preferably monoanhydrohexitol, and more concretely 1,4-anhydrohexitol, 3,6-anhydrohexitol, 2,5-anhydrohexitol, 1,5-anhydrohexitol, 2,6-anhydrohexitol or a mixture of two or more of the foregoing.

Dianhydrosugar alcohol is an anhydrosugar alcohol formed by removing two molecules of water from inside of the hydrogenated sugar, and it has a diol form with two hydroxyl groups in the molecule, and can be produced by using hexitol derived from starch. Because dianhydrosugar alcohol is an environment-friendly material derived from recyclable natural resources, it has received much interest for a long time and researches on its production continue to proceed. Among such dianhydrosugar alcohols, isosorbide produced from sorbitol has the widest industrial applicability at present.

In the present invention, the kind of the dianhydrosugar alcohol is not especially limited, and it may be preferably dianhydrohexitol, and more concretely 1,4:3,6-dianhydrohexitol. 1,4:3,6-dianhydrohexitol may be isosorbide, isomannide, isoidide or a mixture of two or more of the foregoing.

In the present invention, the polymer of one or more of monoanhydrosugar alcohol and dianhydrosugar alcohol (that is, polymer of monoanhydrosugar alcohol and/or dianhydrosugar alcohol) may be a condensation polymer prepared from condensation reaction of monoanhydrosugar alcohol, condensation reaction of dianhydrosugar alcohol, or condensation reaction of monoanhydrosugar alcohol and dianhydrosugar alcohol. In the condensation reaction, the position and order of condensation between the monomers are not especially limited, and may be selected within the scope conventionally expectable by a skilled artisan without limitation.

In an embodiment of the present invention, for example, the polymer of one or more of monoanhydrosugar alcohol and dianhydrosugar alcohol may be one or more selected from the group consisting of polymers represented by the following formulas 1 to 5—which are, however, just examples of polymers prepared according to the position and order of condensation between the monomers in condensation reaction—and thus the polymer is not limited thereto:

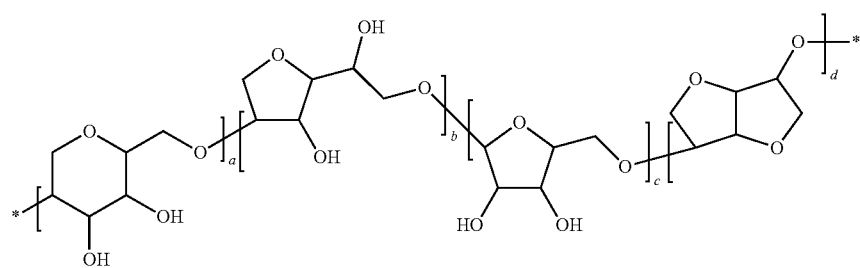

[Formula 1]

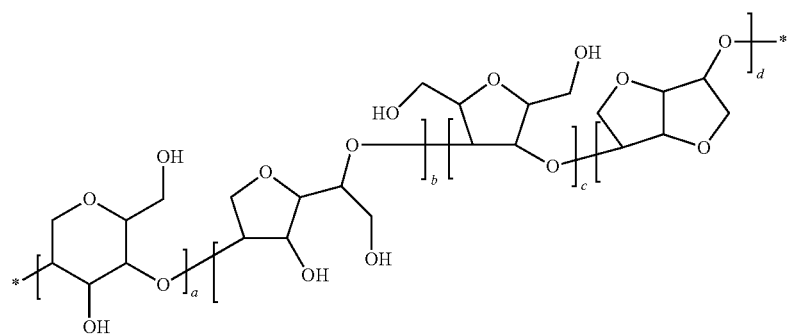

[Formula 2]

-continued

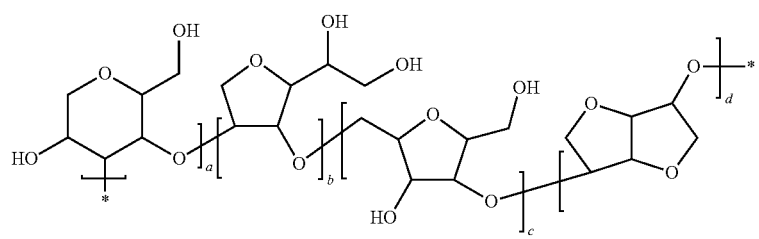

[Formula 3]

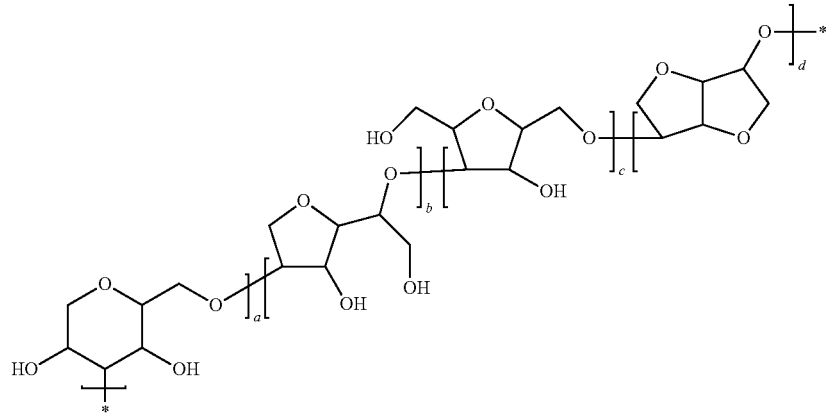

[Formula 4]

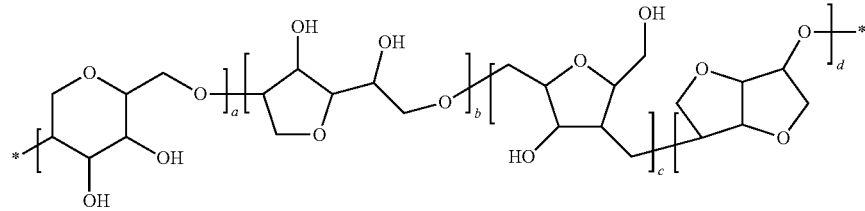

[Formula 5]

wherein: in formulas 1 to 5,
each of a to d is independently an integer of 0 to 25 (concretely an integer of 0 to 10, and more concretely an integer of 0 to 5), provided that a+b+c+d is 2 to 100 (concretely 2 to 50, and more concretely 2 to 20).

In an embodiment, the polyol composition of present invention may comprise, based on total weight of the composition, the monoanhydrosugar alcohol in an amount of 0.1 to 95% by weight, more concretely 10 to 40% by weight; the dianhydrosugar alcohol in an amount of 0.1 to 95% by weight, more concretely 1 to 50% by weight; and the polymer of one or more of monoanhydrosugar alcohol and dianhydrosugar alcohol in an amount of 5 to 99% by weight, more concretely 30 to 90% by weight.

In the present invention, the number average molecular weight (Mn: g/mol) of the polyol composition may be 160 or more, 165 or more, 170 or more, or 174 or more. Also, the number average molecular weight (Mn) of the polyol composition of the present invention may be 445 or less, 440 or less, 430 or less, 420 or less, 410 or less, 400 or less, or 395 or less.

In an embodiment, the number average molecular weight (Mn) of the polyol composition may be 160 to 445, concretely 165 to 440, more concretely 170 to 400, still more concretely 175 to 395, and still more concretely 175 to 393. If the number average molecular weight of the polyol composition is less than 160 or greater than 445, when such a polyol composition is used as a chain extender for polyurethane, the effect of improving the physical properties such as tensile strength, elongation ratio, etc. of the polyurethane becomes insufficient.

In the present invention, the poly dispersity index (PDI) of the polyol composition may be 1.25 or more, 1.30 or more, or 1.33 or more. Also, the poly dispersity index (PDI) of the polyol composition of the present invention may be 3.15 or less, 3.10 or less, 3.0 or less, 2.90 or less, 2.80 or less, or 2.75 or less.

In an embodiment, the poly dispersity index (PDI) of the polyol composition may be 1.25 to 3.15, concretely 1.30 to 3.10, more concretely 1.30 to 3.0, still more concretely 1.33 to 2.80, and still more concretely 1.34 to 2.75. If the poly dispersity index of the polyol composition is less than 1.25 or greater than 3.15, when such a polyol composition is used as a chain extender for polyurethane, the effect of improving the physical properties such as tensile strength, elongation ratio, etc. of the polyurethane becomes insufficient.

Also, in the present invention, the hydroxyl value (mg KOH/g) of the polyol composition may be 645 or more, 650 or more, 655 or more, 659 or more, or 660 or more. Also, the hydroxyl value of the polyol composition of the present invention may be 900 or less, 895 or less, 892 or less, or 891 or less.

In an embodiment, the hydroxyl value of the polyol composition may be 645 to 900, concretely 650 to 900, more concretely 655 to 895, still more concretely 660 to 892, and still more concretely 660 to 891. If the hydroxyl value of the polyol composition is less than 645 mgKOH/g or greater than 900 mgKOH/g, when such a polyol composition is used as a chain extender for polyurethane, the effect of improving the physical properties such as tensile strength, elongation ratio, etc. of the polyurethane becomes insufficient.

According to an embodiment, the polyol composition of present invention, which satisfies the above conditions of number average molecular weight (Mn), poly dispersity index (PDI) and hydroxyl value, may further satisfy the condition that the average number of —OH groups per molecule in the composition is 2.6 to 5.0

In such an embodiment, the average number of —OH groups per molecule in the polyol composition may be 2.6 or more, 2.7 or more, or 2.8 or more. Also, the average number of —OH groups per molecule in the polyol composition of the present invention may be 5.0 or less, 4.9 or less, 4.8 or less, 4.7 or less, or 4.6 or less.

More concretely, the average number of —OH groups per molecule in the polyol composition may be 2.7 to 4.9, still more concretely 2.7 to 4.7, and still more concretely 2.8 to 4.6. If the average number of —OH groups per molecule in the polyol composition is within the range of 2.6 to 5.0, when such a polyol composition is used as a chain extender for polyurethane, the effect of improving the physical properties such as tensile strength, elongation ratio, etc. of the polyurethane can be further enhanced.

In an embodiment, the polyol composition of present invention may be prepared by dehydration reaction of hydrogenated sugar with heating in the presence of acid catalyst and thin film distillation (for example, short path distillation) of the resulting product of the dehydration reaction. More concretely, the dehydration reaction may be conducted by heating hydrogenated sugar such as sorbitol, etc. in the presence of acid catalyst such as sulfuric acid, etc. under reduced pressure condition of, for example, 25 to 40 torr, to a temperature of 125 to 150° C., and the resulting product of such dehydration reaction, after neutralization with a base if necessary, may be subjected to thin film distillation by using a short path distillator (SPD) at a temperature of 150 to 175° C. under reduced pressure condition of, for example, 2 mbar or less, but it is not limited thereto.

The polyol composition of present invention as explained above, particularly when used as a chain extender for polyurethane, can remarkably improve the physical properties such as tensile strength, elongation ratio, etc. of the polyurethane.

Therefore, another aspect of the present invention provides a chain extender, more concretely a chain extender for polyurethane, comprising the polyol composition of the present invention.

The chain extender of the present invention may further comprise an additional chain extender component other than the polyol composition according to the present invention. There is no special limitation to the additional chain extender component other than the polyol composition, and any conventional chain extender component properly selectable by a skilled artisan in this field may be used, and for example, it may be one or more selected from the group consisting of 1,4-butanediol, isosorbide, hydrazine monohydrate, ethylene diamine, dimethyl hydrazine, 1,6-hexamethylene bishydrazine, hexamethylene diamine, isophorone diamine, diaminophenylmethane or a combination thereof.

Furthermore, another aspect of the present invention provides a chain-extended polyurethane, comprising: polyurethane prepolymer; and chain-extended part by the chain extender of the present invention.

In an embodiment, as the polyurethane prepolymer, those prepared from polyol and isocyanate may be used.

As the polyol component, any conventional polyol compound known in this field may be used without special limitation, and plural multifunctional alcohols may be utilized in the context of the present invention. Such a polyol should not contain additional functional group, for example, reactive with reactive amino group, preferably NCO group. Compounds having plural OH groups may have terminal OH groups or lateral OH groups distributed throughout the chain. The OH group is a group that can react with isocyanate, and particularly primary or secondary OH group. It is suitable to use polyol having 2 to 10 OH groups per molecule in average, and preferably 2 to 6 OH groups per molecule in average. As long as the average functionality is maintained, it is possible to use a mixture of different polyols. The number average molecular weight of the polyol may be 500 to 10,000 g/mol. An example of suitable polyol is a polyol based on polyether, polyalkylene, polyester, polyurethane, polycarbonate or a combination thereof. More preferably, the polyol may be ether polyol (for example, poly(tetramethyleneether glycol), PTMEG), polycarbonate polyol, acrylic polyol, polyester polyol or a combination thereof. The polyol preferably exists in a liquid form at room temperature (25° C.), and in case of mixture, each polyol is liquid at room temperature (25° C.) individually.

The isocyanate contains preferably 2 to 5 NCO groups in average, preferably 4 or less NCO groups in average. An example of suitable isocyanate is aromatic isocyanate, for example, 2,4- or 4,4'-methylene diphenyl diisocyanate (MDI), xylylene diisocyanate (XDI), m- or p-tetramethylxylylene diisocyanate (TMXDI), toluylene diisocyanate (TDI), di- or tetra-alkyldiphenylmethane diisocyanate, 3,3'-dimethyldiphenyl-4,4'-diisocyanate (TODI), 1,3-phenylene diisocyanate, 1,4-phenylene diisocyanate, naphthalene diisocyanate (NDI), 4,4'-dibenzyldiisocyanate; aliphatic isocyanate, for example, hydrogenated MDI (H12MDI), 1-methyl-2,4-diisocyanatocyclohexane, 1,12-diisocyanatododecane, 1,6-diisocyanato-2,2,4-trimethylhexane, 1,6-diisocyanato-2,4,4-trimethylhexane, isophorone diisocyanate (IPDI), tetramethoxy butane-1,4-diisocyanate, butane-1,4-diisocyanate, hexane-1,6-diisocyanate (HDI), dimeric fatty acid diisocyanate, dicyclohexylmethane diisocyanate, cyclohexane-1,4-diisocyanate, ethylene diisocyanate or a combination thereof.

In an embodiment, the chain extender may be used in an amount of 1 to 20 parts by weight, more concretely 2 to 15 parts by weight, based on 100 parts by weight of the polyurethane prepolymer. Also, the molar ratio of isocyanate group in the polyurethane prepolymer to hydroxyl group in the chain extender may be 1:1.1 to 1:0.9, and more concretely 1:1.05 to 1:0.95.

In an embodiment, the chain-extended polyurethane of the present invention may be prepared by a method for preparing a chain-extended polyurethane comprising the steps of: (1) reacting polyol and isocyanate to prepare a polyurethane prepolymer: (2) adding the chain extender according to the present invention to the prepared polyurethane prepolymer; and (3) reacting the resulting mixture of step (2).

In the method for preparing the chain-extended polyurethane of the present invention, the polyurethane prepolymer may be obtained by reacting polyol and isocyanate—for example, the polyurethane prepolymer may be prepared by adding polyol (sufficiently dried under vacuum at 50 to 100° C., preferably 70 to 90° C., for 12 to 36 hours, preferably 20 to 28 hours) and isocyanate in a 4-necked reactor, and reacting them under nitrogen atmosphere while maintaining 50 to 100° C., preferably 50 to 70° C. for 0.1 to 5 hour, preferably 0.5 to 2 hours.

Then, the chain extender is added to the polyurethane prepolymer, and the mixture is fed into a mold treated with coating and cured at 80 to 200° C., preferably 100 to 150° C., for 10 to 30 hours, preferably 15 to 25 hours, thereby the chain-extended polyurethane can be prepared.

Another aspect of the present invention provides a polyurethane adhesive comprising the chain-extended polyurethane of the present invention. The chain-extended polyurethane of the present invention can be melted appropriately at a suitable temperature (for example, 180° C.), and utilized in use as adhesive (preferably hot melt adhesive). The polyurethane adhesive of the present invention may further comprise additive that can be conventionally used in adhesive.

The present invention is explained in more detail through the following Examples and Comparative Examples. However, the scope of the present invention is not limited thereby in any manner.

EXAMPLES

<Preparation of Polyol Composition Comprising Anhydrosugar Alcohol and Polymer of Anhydrosugar Alcohol>

Example A1: Preparation of Polyol Composition by Using Thin Film Distillator

In a 3-necked glass reactor equipped with an agitator, 1,000 g of sorbitol powder (D-sorbitol) was added and the inside temperature of the reactor was elevated to 110° C. for melting, and then 10 g of concentrated sulfuric acid (95%) was added thereto and the reaction temperature was elevated to 135° C. Then, the dehydration reaction was conducted for 4 hours under vacuum condition of 30 torr. Thereafter, the inside temperature of the reactor was lowered to 110° C., and 20 g of 50% sodium hydroxide solution was added to the dehydration reaction product solution for neutralization, and then the neutralized solution was fed into a thin film distillator (concretely, short path distillator (SPD)) for distillation. At that time, the distillation was carried out at 160° C. under vacuum condition of 1 mbar, and the distilled liquid was separated. After the separation, obtained was 304 g of polyol composition comprising 31% by weight of isosorbide (dianhydrosugar alcohol), 17% by weight of sorbitan (monoanhydrosugar alcohol) and 52% by weight of polymer thereof, wherein the number average molecular weight of the composition was 257 g/mol, the poly dispersity index of the composition was 1.78, the hydroxyl value of the composition was 783 mg KOH/g, and the average number of —OH groups per molecule in the composition was 3.6.

Example A2: Preparation of Polyol Composition by Using Thin Film Distillator

In a 3-necked glass reactor equipped with an agitator, 1,000 g of sorbitol powder (D-sorbitol) was added and the inside temperature of the reactor was elevated to 110° C. for melting, and then 10 g of concentrated sulfuric acid (95%) was added thereto and the reaction temperature was elevated to 125° C. Then, the dehydration reaction was conducted for 4 hours under vacuum condition of 40 torr. Thereafter, the inside temperature of the reactor was lowered to 110° C., and 20 g of 50% sodium hydroxide solution was added to the dehydration reaction product solution for neutralization, and then the neutralized solution was fed into a thin film distillator (concretely, short path distillator (SPD)) for distillation. At that time, the distillation was carried out at 150° C. under vacuum condition of 1 mbar, and the distilled liquid was separated. After the separation, obtained was 325 g of polyol composition comprising 46% by weight of isosorbide (dianhydrosugar alcohol), 39% by weight of sorbitan (monoanhydrosugar alcohol) and 15% by weight of polymer thereof, wherein the number average molecular weight of the composition was 175 g/mol, the poly dispersity index of the composition was 1.34, the hydroxyl value of the composition was 891 mg KOH/g, and the average number of —OH groups per molecule in the composition was 2.8.

Example A3: Preparation of Polyol Composition by Using Thin Film Distillator

In a 3-necked glass reactor equipped with an agitator, 1,000 g of sorbitol powder (D-sorbitol) was added and the inside temperature of the reactor was elevated to 110° C. for melting, and then 10 g of concentrated sulfuric acid (95%) was added thereto and the reaction temperature was elevated to 145° C. Then, the dehydration reaction was conducted for 4 hours under vacuum condition of 25 torr. Thereafter, the inside temperature of the reactor was lowered to 110° C., and 20 g of 50% sodium hydroxide solution was added to the dehydration reaction product solution for neutralization, and then the neutralized solution was fed into a thin film distillator (concretely, short path distillator (SPD)) for distillation. At that time, the distillation was carried out at 175° C. under vacuum condition of 1 mbar, and the distilled liquid was separated. After the separation, obtained was 272 g of polyol composition comprising 8% by weight of isosorbide (dianhydrosugar alcohol), 12% by weight of sorbitan (monoanhydrosugar alcohol) and 80% by weight of polymer thereof, wherein the number average molecular weight of the composition was 393 g/mol, the poly dispersity index of the composition was 2.75, the hydroxyl value of the composition was 660 mg KOH/g, and the average number of —OH groups per molecule in the composition was 4.6.

Comparative Example A1: Preparation of Polyol Composition by Using Thin Film Distillator In a 3-necked glass reactor equipped with an agitator, 1,000 g of sorbitol powder (D-sorbitol) was added and the inside temperature of the reactor was elevated to 110° C. for melting, and then 10 g of concentrated sulfuric acid (95%) was added thereto and the reaction temperature was elevated to 120° C. Then, the dehydration reaction was conducted for 4 hours under vacuum condition of 45 torr. Thereafter, the inside temperature of the reactor was lowered to 110° C., and 20 g of 50% sodium hydroxide solution was added to the dehydration reaction product solution for neutralization, and then the neutralized solution was fed into a thin film distillator (concretely, short path distillator (SPD)) for distillation. At that time, the distillation was carried out at 150° C. under vacuum condition of 1 mbar, and the distilled liquid was separated. After the separation, obtained was 345 g of polyol composition comprising 55% by weight of isosorbide (dianhydrosugar alcohol), 43% by weight of sorbitan (monoanhydrosugar alcohol) and 2% by weight of polymer thereof, wherein the number average molecular weight of the composition was 152 g/mol, the poly dispersity index of the composition was 1.21, the hydroxyl value of the composition was 905 mg KOH/g, and the average number of —OH groups per molecule in the composition was 2.4.

Comparative Example A2: Preparation of Polyol Composition by Using Thin Film Distillator In a 3-necked glass reactor equipped with an agitator, 1,000 g of sorbitol powder (D-sorbitol) was added and the inside temperature of the reactor was elevated to 110° C. for melting, and then 10 g of concentrated sulfuric acid (95%) was added thereto and the reaction temperature was elevated to 155° C. Then, the dehydration reaction was conducted for 5 hours under vacuum condition of 20 torr. Thereafter, the inside temperature of the reactor was lowered to 110° C., and 20 g of 50% sodium hydroxide solution was added to the dehydration reaction product solution for neutralization, and then the neutralized solution was fed into a thin film distillator (concretely, short path distillator (SPD)) for distillation. At that time, the distillation was carried out at 170° C. under vacuum condition of 1 mbar, and the distilled liquid was separated. After the separation, obtained was 262 g of polyol composition comprising 3% by weight of isosorbide (dianhydrosugar alcohol), 4% by weight of sorbitan (monoanhydrosugar alcohol) and 93% by weight of polymer thereof, wherein the number average molecular weight of the composition was 448 g/mol, the poly dispersity index of the composition was 3.18, the hydroxyl value of the composition was 641 mg KOH/g, and the average number of —OH groups per molecule in the composition was 5.1.

Comparative Example A3: Preparation of Polyol Composition by Using Simple Distillation Under Reduced Pressure According to the method disclose in Korean Laid-open Patent Publication No. 10-2017-0015290, a polyol composition was prepared by using simple distillation under reduced pressure as follows:

In a 3-necked glass reactor equipped with an agitator, 1,000 g of sorbitol powder (D-sorbitol) was added and the inside temperature of the reactor was elevated to 110° C. for melting, and then 10 g of concentrated sulfuric acid (95%) was added thereto and the reaction temperature was elevated to 135° C. Then, the dehydration reaction was conducted for 4 hours under vacuum condition of 30 torr. Thereafter, the inside temperature of the reactor was lowered to 110° C., and 20 g of 50% sodium hydroxide solution was added to the dehydration reaction product solution for neutralization, and then in the reactor, the neutralized solution was subjected to simple distillation under reduced pressure at 200° C. under vacuum condition below 50 mbar, and the distilled liquid was separated. After the separation, obtained was 379 g of polyol composition comprising 71% by weight of isosorbide (dianhydrosugar alcohol), 22% by weight of sorbitan (monoanhydrosugar alcohol) and 7% by weight of polymer thereof, wherein the number average molecular weight of the composition was 159 g/mol, the poly dispersity index of the composition was 1.18, the hydroxyl value of the composition was 904 mg KOH/g, and the average number of —OH groups per molecule in the composition was 2.5.

<Preparation of Chain-Extended Polyurethane>

Example B1: Preparation of Chain-Extended Polyurethane by Using the Polyol Composition of Example A1 as Chain Extender 50 g (1,000 g/mol) of a polyol composition of PTMEG 1000 (Aldrich) sufficiently dried under vacuum at 80° C. for 24 hours and 25.025 g of 4,4'-methylene diphenyl diisocyanate (MDI) were added in a 4-necked reactor, and the reaction was conducted under nitrogen atmosphere while maintaining 60° C. for 1 hour to prepare polyurethane prepolymer. Then, NCO % of the polyurethane prepolymer was measured, and when it reached the theoretical NCO %, 72 g of the polyol composition of Example A1 was added as chain extender and mixed. The mixture was fed into a mold treated with silicone coating, and cured at 110° C. for 16 hours to prepare a chain-extended polyurethane film.

Example B2: Preparation of Chain-Extended Polyurethane by Using the Polyol Composition of Example A2 as Chain Extender Excepting that 76 g of the polyol composition of Example A2 was used instead of 72 g of the polyol composition of Example A1, the same method as Example B1 was conducted to prepare a chain-extended polyurethane film.

Example B3: Preparation of Chain-Extended Polyurethane by Using the Polyol Composition of Example A3 as Chain Extender Excepting that 187 g of the polyol composition of Example A3 was used instead of 72 g of the polyol composition of Example A1, the same method as Example B1 was conducted to prepare a chain-extended polyurethane film.

Comparative Example B1: Preparation of Chain-Extended Polyurethane by Using the Polyol Composition of Comparative Example A1 as Chain Extender Excepting that 63 g of the polyol composition of Comparative Example A1 was used instead of 72 g of the polyol composition of Example A1, the same method as Example B1 was conducted to prepare a chain-extended polyurethane film.

Comparative Example B2: Preparation of Chain-Extended Polyurethane by Using the Polyol Composition of Comparative Example A2 as Chain Extender Excepting that 215 g of the polyol composition of Comparative Example A2 was used instead of 72 g of the polyol composition of Example A1, the same method as Example B1 was conducted to prepare a chain-extended polyurethane film.

Comparative Example B3: Preparation of Chain-Extended Polyurethane by Using the Polyol Composition of Comparative Example A3 as Chain Extender Excepting that 65 g of the polyol composition of Comparative Example A3 was used instead of 72 g of the polyol composition of Example A1, the same method as Example B1 was conducted to prepare a chain-extended polyurethane film.

<Preparation of Hot Melt Sample>

Each of the chain-extended polyurethane films prepared in Examples B1 to B3 and Comparative Examples B1 to B3 was cut in dog bone shape according to ASTM D412 to prepare a hot melt adhesive sample.

<Methods for Measuring Properties>

Number average molecular weight (Mn) and poly dispersity index (PDI): Each of the polyol compositions prepared in the above Examples and Comparative Examples was dissolved in N,N-dimethylformamide in an amount of 1 to 3 parts by weight, and the number average molecular weight (Mn) and poly dispersity index (PDI) were measured by using Gel Permeation Chromatography (GPC) (Agilent). The used column was PLgel 3 μm MIXED-E 300×7.5 mm (Agilent), the column temperature was 50° C., the used eluent was N,N-dimethylformamide containing 0.05 M NaBr with a flow rate of 0.5 mL/min, and the used standard was polystyrene (Aldrich).

Hydroxyl value: According to the hydroxyl value test standard ASTM D-4274D, the hydroxyl values of the polyol compositions were measured by conducting esterification reaction of each of the polyol compositions prepared in the above Examples and Comparative Examples with excessive phthalic anhydride in the presence of imidazole catalyst and then titrating the residual phthalic anhydride with 0.5 N sodium hydroxide (NaOH).

Average number of —OH groups per molecule: The average number of —OH groups per molecule in the polyol composition was calculated according to the following equation:

Average number of —OH groups per molecule=
(hydroxyl value×number average molecular weight)/56100

Tensile strength and elongation ratio: Tensile strength and elongation ratio were measured by using UTM (Instron 5967, Instron) with a speed of 5 mm/min. Concretely, for each hot melt adhesive sample, tensile strength and elongation ratio were measured five times in total, and the average values were calculated.

The properties of the polyol compositions of Examples A1 to A3 and Comparative Examples A1 to A3 and the properties of the hot melt adhesives prepared by using the chain-extended polyurethanes of Examples B1 to B3 and Comparative Examples B1 to B3 are shown in the following Table 1.

respectively, exhibited excellent tensile strength as 30 MPa or higher, and at the same time excellent elongation ratio as 280% or higher.

However, the chain-extended polyurethane-based hot melt adhesives of Comparative Examples B1 and B3 prepared by using as a chain extender the polyol compositions of Comparative Examples A1 and A3 exhibited very poor tensile strength and elongation ratio together due to the low number average molecular weight and low poly dispersity index of the chain extender, and the chain-extended polyurethane-based hot melt adhesive of Comparative Example B2 prepared by using as a chain extender the polyol composition of Comparative Example A2 exhibited relatively poor tensile strength and elongation ratio due to the non-uniform reactivity due to the excessive molecular weight distribution.

The invention claimed is:

1. A polyol composition comprising monoanhydrosugar alcohol; dianhydrosugar alcohol; and polymer of one or more of monoanhydrosugar alcohol and dianhydrosugar alcohol, wherein:
   (i) the number average molecular weight (Mn) of the composition is 160 to 445;
   (ii) the poly dispersity index (PDI) of the composition is 1.25 to 3.15; and
   (iii) the hydroxyl value of the composition is 645 to 900 mgKOH/g.

2. The polyol composition of claim 1, wherein the average number of —OH groups per molecule in the composition is 2.6 to 5.0.

3. The polyol composition of claim 1, wherein one or more of the monoanhydrosugar alcohol; dianhydrosugar alcohol; and polymer of one or more of monoanhydrosugar alcohol and dianhydrosugar alcohol is obtained in a procedure for preparing anhydrosugar alcohol by dehydration reaction of hydrogenated sugar.

4. The polyol composition of claim 1, wherein the monoanhydrosugar alcohol is monoanhydrohexitol.

5. The polyol composition of claim 1, wherein the dianhydrosugar alcohol is dianhydrohexitol.

6. The polyol composition of claim 1, wherein the polymer of one or more of monoanhydrosugar alcohol and dianhydrosugar alcohol is a condensation polymer prepared

TABLE 1

| | | Example | | | Comparative Example | | |
|---|---|---|---|---|---|---|---|
| | | A1 | A2 | A3 | A1 | A2 | A3 |
| Properties of polyol composition | Number average molecular weight (g/mol) | 257 | 175 | 393 | 152 | 448 | 159 |
| | Poly dispersity index | 1.78 | 1.34 | 2.75 | 1.21 | 3.18 | 1.18 |
| | Hydroxyl value (mgKOH/g) | 783 | 891 | 660 | 905 | 641 | 904 |
| | Average number of —OH groups per molecule | 3.6 | 2.8 | 4.6 | 2.4 | 5.1 | 2.5 |

| | | Example | | | Comparative Example | | |
|---|---|---|---|---|---|---|---|
| | | B1 | B2 | B3 | B1 | B2 | B3 |
| Properties of polyurethane | Tensile strength (MPa) | 30 | 32 | 34 | 25 | 27 | 26 |
| | Elongation ratio (%) | 300 | 290 | 280 | 200 | 240 | 220 |

As shown in Table 1, the chain-extended polyurethane-based hot melt adhesives of Examples B1 to B3 prepared by using as a chain extender the polyol compositions of Examples A1 to A3 according to the present invention, from condensation reaction of monoanhydrosugar alcohol, condensation reaction of dianhydrosugar alcohol, or condensation reaction of monoanhydrosugar alcohol and dianhydrosugar alcohol.

7. The polyol composition of claim 1, wherein the polymer of one or more of monoanhydrosugar alcohol and dianhydrosugar alcohol is one or more selected from the group consisting of polymers represented by the following formulas 1 to 5:

wherein: in formulas 1 to 5,
each of a to d is independently an integer of 0 to 25, provided that a+b+c+d is 2 to 100.

8. The polyol composition of claim 1 which is prepared by dehydration reaction of hydrogenated sugar with heating in

[Formula 1]

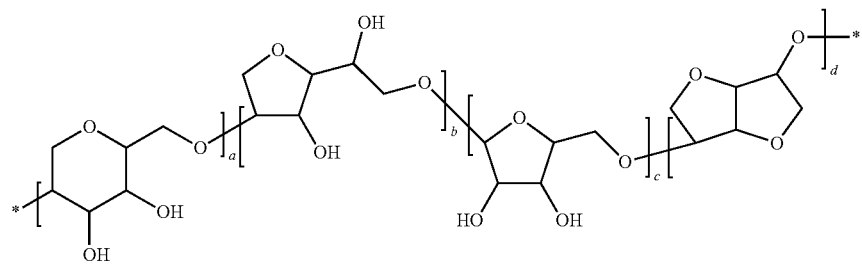

[Formula 2]

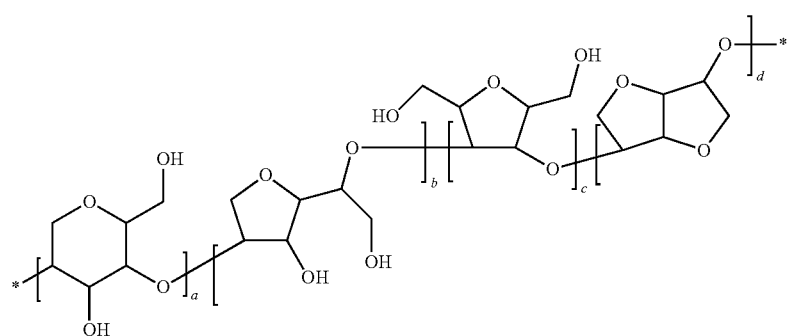

[Formula 3]

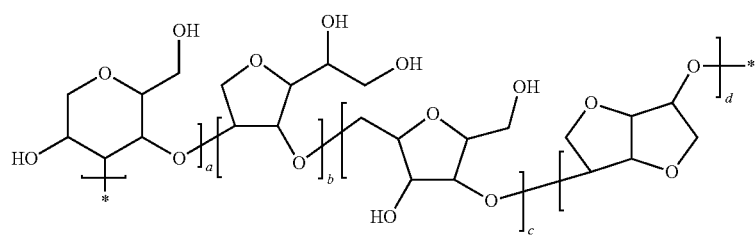

[Formula 4]

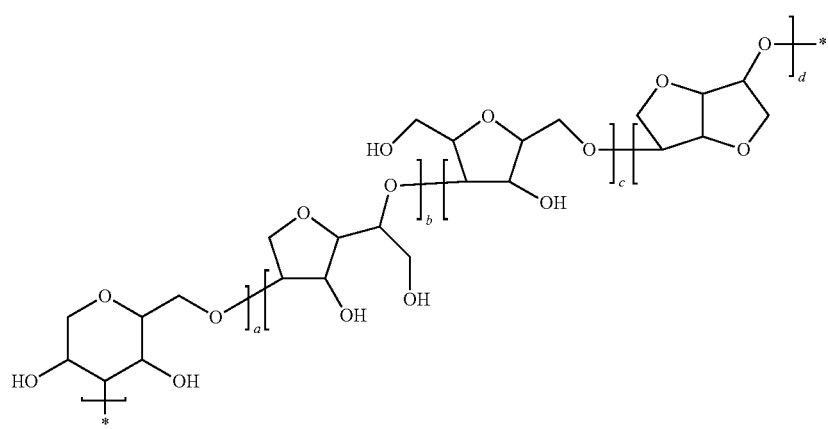

[Formula 5]

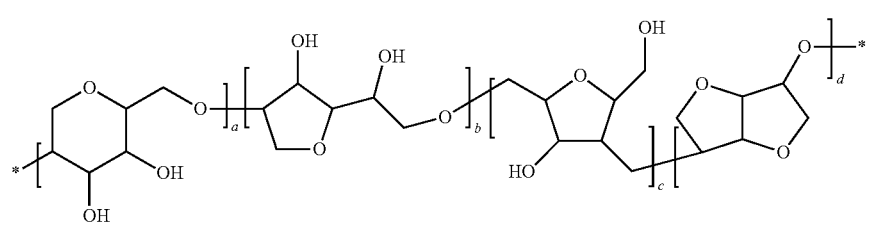

the presence of acid catalyst and thin film distillation of the resulting product of the dehydration reaction.

9. The polyol composition of claim 8, wherein the dehydration reaction is conducted under reduced pressure condition of 25 to 40 torr and heating condition of 125 to 150° C., and the thin film distillation is conducted under reduced pressure condition of 2 mbar or less and heating condition of 150 to 175° C.

10. A chain extender comprising the polyol composition of claim 1.

11. A chain-extended polyurethane, comprising:
polyurethane prepolymer; and
chain-extended part by the chain extender of claim 10.

12. A polyurethane adhesive comprising the chain-extended polyurethane of claim 11.

* * * * *